(12) United States Patent
Hamada

(10) Patent No.: US 7,764,880 B2
(45) Date of Patent: Jul. 27, 2010

(54) PICKUP APPARATUS

(75) Inventor: Takashi Hamada, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 268 days.

(21) Appl. No.: 12/026,059

(22) Filed: Feb. 5, 2008

(65) Prior Publication Data

US 2008/0199172 A1 Aug. 21, 2008

(30) Foreign Application Priority Data

Feb. 15, 2007 (JP) .............................. 2007-034707

(51) Int. Cl.
G03B 15/05 (2006.01)
(52) U.S. Cl. ..................... 396/157; 396/61; 396/164; 348/371
(58) Field of Classification Search ...................... None
See application file for complete search history.

(56) References Cited

U.S. PATENT DOCUMENTS

| | | | | |
|---|---|---|---|---|
| 2006/0044422 A1* | 3/2006 | Miyazaki | ..................... | 348/234 |
| 2007/0146539 A1* | 6/2007 | Kawahara et al. | ........... | 348/370 |
| 2007/0189752 A1* | 8/2007 | Kobayashi | ................... | 396/157 |
| 2008/0074536 A1* | 3/2008 | Tamura | ...................... | 348/371 |
| 2008/0181597 A1* | 7/2008 | Tamura | ...................... | 396/164 |
| 2009/0073275 A1* | 3/2009 | Awazu | ..................... | 348/222.1 |

FOREIGN PATENT DOCUMENTS

JP 2000-155358 6/2000

* cited by examiner

*Primary Examiner*—W. B. Perkey
*Assistant Examiner*—Bret Adams
(74) *Attorney, Agent, or Firm*—Volpe and Koenig, P.C.

(57) ABSTRACT

An image pickup apparatus, for controlling actual flash amount at the time of exposure based on an amount of reflected light from a predetermined metering region of a screen, comprises a first screen dividing section for dividing the screen into a first region, constituting a candidate for the metering region, and a second region other than that by comparing first feature data of image data that has been acquired by performing pre-flash before actual flash and second feature data of image data taken without performing pre-flash, a second screen dividing section for dividing the screen into a third region, being a region of an image having a predetermined feature, and a fourth region other than that, an image evaluation section for evaluating whether to include in the metering region or remove from the metering region based on different evaluation criteria according to whether the image of the third region or the fourth region belongs to the first region, or belongs to the second region, and a flash amount control section for controlling actual flash amount based on reflected light amount from regions that have been included in the metering region by the image evaluation section.

6 Claims, 8 Drawing Sheets make into normal light group make into pre-flash group normal light

—71 pre-flash

—71 make into normal light group make into pre-flash group normal light (dark) ∩ pre-flash light (bright)

normal light pre-flash make into normal light group make into pre-flash group normal light (dark) ∩ pre-flash light (bright)

PICKUP APPARATUS

Benefit is claimed, under 35 U.S.C. §119, to the filing date of prior Japanese Patent Application No. 2007-34707, filed on Feb. 15, 2007. This application is expressly incorporated herein by reference. The scope of the present invention is not limited to any requirements of the specific embodiments described in the application.

BACKGROUND OF THE INVENTION

1. Field of the Invention

The present invention relates to an image pickup device, and in detail relates to an image pickup device for carrying out metering with a plurality of photosenors, and controlling light amount of a strobe unit.

2. Description of the Related Art

In the event that subject brightness is dark, appropriate exposure is obtained by using a strobe unit to provide supplementary light. In this case, reflected light amount returned to the image pickup device varies according to subject distance and subject reflectance etc., and it is impossible to ignore the influence of background light etc., and therefore an image pickup device has been known in which before taking a picture pre-flash is carried out using a strobe unit, the amount of reflected light at this time is measured, and reflected light amount of the strobe unit is controlled (flash light amount control) using metering values at the time of this pre-flash and metering values for normal light.

For example, Japanese unexamined patent application No. 2000-155358 (laid-open Jun. 6, 2000) discloses performing metering by dividing a metering region into a plurality of regions, performing metering in a state where a flash unit does not emit light and a state where the flash units emits pre-flash, obtaining subject reflected light as a result of pre-flash in each of divided regions from a difference in metering results, and selecting a flash light amount control object region for the flash unit from each of the divided regions based on the reflected light amounts.

SUMMARY OF THE INVENTION

In view of the above described situation, and object of the invention is to provide an image pickup apparatus and an imaging method that can provide an image of a brightness that is well balanced over an entire screen, even under various circumstances.

An image pickup apparatus of the present invention controls actual flash amount at the time of exposure based on an amount of reflected light from a predetermined metering region of a screen, and comprises a first screen dividing section for dividing the screen into a first region, constituting a candidate for the metering region, and a second region other than that by comparing first feature data of image data that has been acquired by performing pre-flash before actual flash, and second feature data of image data taken without performing pre-flash, a second screen dividing section for dividing the screen into a third region, being a region of an image having a predetermined feature, and a fourth region other than that, an image evaluation section for evaluating whether to include in the metering region or remove from the metering region based on different evaluation criteria according to whether the image of the third region or the fourth region belongs to the first region, or belongs to the second region, and a flash amount control section for controlling actual flash amount based on reflected light amount from regions that have been included in the metering region by the image evaluation section.

DETAILED DESCRIPTION OF THE PREFERRED EMBODIMENTS

In the following, one preferred embodiment using a digital camera as one example of an image pickup apparatus adopting the present invention will be described according to the drawings. This digital camera comprises an imaging optical system, an image sensor for photoelectrically converting a subject image acquired by the imaging optical system, and an image processing section for processing image signals output from the image sensor. Still image digital image data that has been processed by the image processing section is stored in a storage medium in response to operation of a release button. At the time of an operation to acquire an image signal output from the image sensor (imaging operation), subject brightness is measured based on the image signal, and control of aperture, shutter and ISO speed is performed to obtain the correct exposure.

Also, this digital camera has a built in flash unit, or is capable of being fitted with an external flash unit, and at the time of taking a picture it is possible to emit pre-flash beforehand, and also to emit flash light using the flash unit as required, making it possible to obtain a correct exposure. In description in this specification, "screen" means a region where an image is shown, "image" means a subject image presented on the screen, and "image data" means an image that has been converted to electrical signals.

Figure 1:
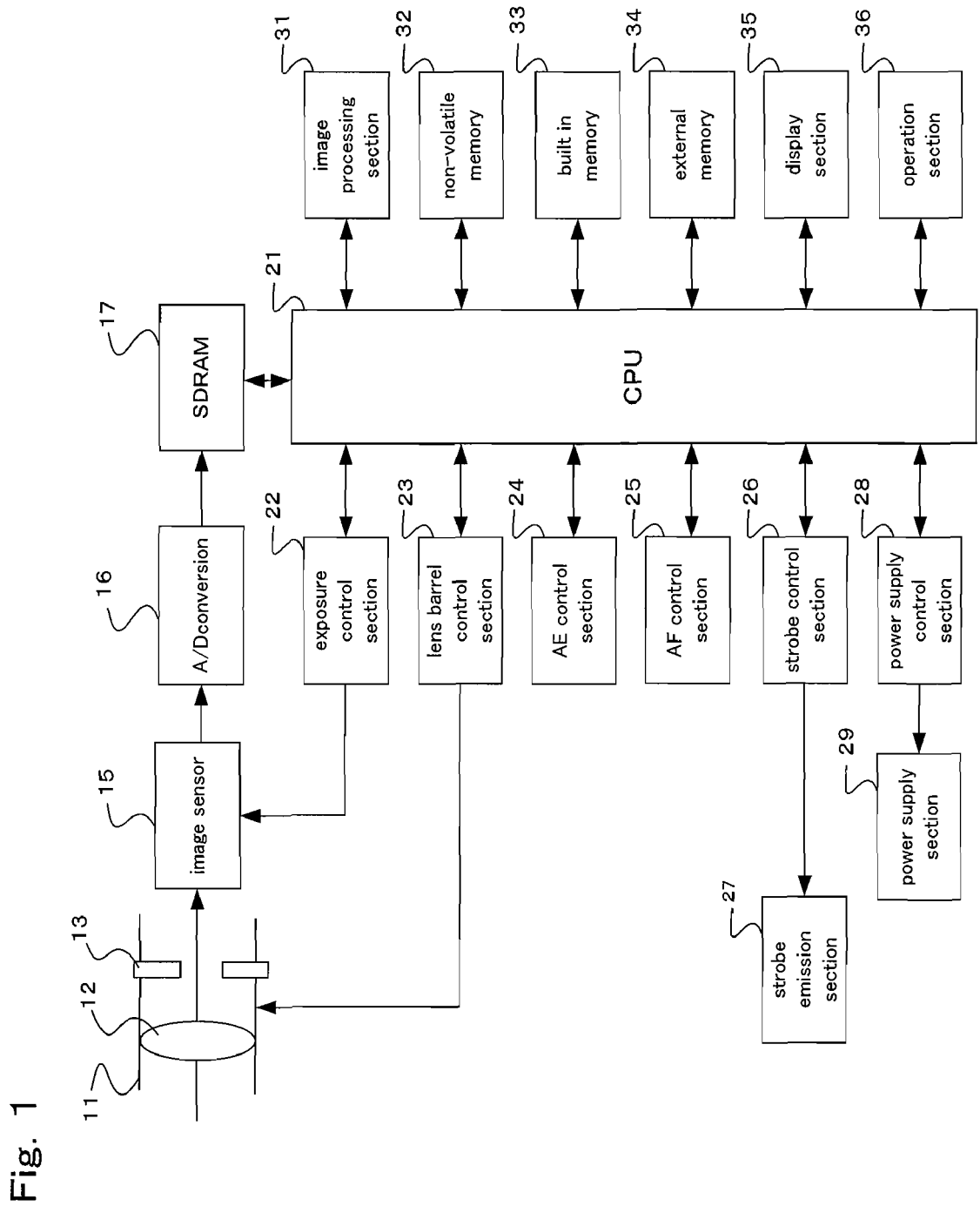
FIG. 1 is an electrical circuit block diagram of a digital camera relating to one embodiment of the present invention.

FIG. 1 is an electrical circuit block diagram of a digital camera relating to one embodiment of the present invention. A photographing optical lens 12 is arranged inside a lens barrel 11, and the lens 12 is subjected to focal point adjustment (focus) and focal length adjustment (zoom) by a barrel control section 23. Also, an aperture 13 is arranged on the optical axis of the lens 12, and this aperture 13 is drive controlled by the barrel control section 23.

An image sensor 15 formed using a two-dimensional image sensor such as a CCD (Charge Coupled Devices) sensor or a CMOS (Complementary Metal Oxide Semiconductor) sensor is arranged behind the aperture 13 on the optical axis of the photographing optical lens 12. The image sensor 15 photoelectrically converts a subject image formed on the image sensor 15 and outputs an analog image signal.

The image sensor 15 is connected to an imaging control section 22, the imaging control section 22 generates a timing signal for reading out an analog image signal, and the image sensor 15 outputs an analog image signal based on this timing signal. Output of the image sensor 15 is connected to an A/D converter 16, and an analog signal read out from the image sensor 15 is subjected to A/D (analog to digital) conversion by the AD converter 16. Output of the AD converter 16 is connected to an SDRAM 17, and the SDRAM 17 temporarily stores digital image data output from the AD converter 16.

The SDRAM 17 is connected to a sequence controller (hereafter referred to as "CPU") 21. The CPU 21 is for performing control of the entire digital camera of this embodiment, and is connected to the imaging control section 22, barrel control section 23, AE control section 24, AF control section 25, strobe control section 26, power supply control section 28, image processing section 31, non-volatile memory 32, built-in memory 33, external memory 34, display section 35 and operating section 36. The imaging control section 22, as previously described, carries out read control for the image sensor 15, and the barrel control section 23 performs drive control for the lens 12 and the aperture 13.

The AE control section 24 subjects the digital image data that has been temporarily stored in the SDRAM 17 to subject brightness evaluation calculation using the image processing section 31 and the CPU 21, and based on evaluation calculation values performs control of the shutter and the aperture 13 by means of the CPU 21. It is also possible to provide a dedicated sensor with multiple photosensors, and obtain subject brightness based on output of the photosensors.

The AF control section 25 uses digital image data that has been temporarily stored in the SDRAM 17 to extract high frequency components of the subject image, and performs a focus operation using the so-called contrast method. Based on the extracted high frequency components, the lens 12 is driven to the focus position by means of the CPU 31 and the barrel control section 23. Of course there is no problem in using another focus detection method, such as divided pupil range finding.

The strobe control section 26 is connected to the strobe unit 27, and carries out control of flash light emitted by the strobe unit 27. The strobe control section 26 of this embodiment is also capable of pre-flash that is emitted before the actual exposure, as well as the flash emission at the time of exposure. The power supply control section 28 is connected to the power supply circuit 29, and performs control of the power supply for supplying electrical power to the entire digital camera. With the digital camera of this embodiment, the strobe unit is built-in, but there is no problem whatsoever in controlling an externally attached strobe unit from the digital camera body.

The image processing section 31 processes digital image data that has been temporarily stored in the SDRAM 17, and performs so called "live view (electronic viewfinder) display" on the display section 35, and performs image processing in order to store still images in the built-in memory 33 and the external memory 34. Evaluation calculation for exposure control, which will be described later, is also carried out. The non-volatile memory 32 is memory such as flash memory or $E^2$PROM for storing programs for executing sequence control by the CPU 21 and various adjustment values.

The built-in memory 33 is internal memory for storing still images that have been acquired following an exposure operation, while the external memory 34 is removable memory for storing still images. The display section 35 is constructed as a liquid crystal monitor or the like, and as well as the above described live view display performs display of digital camera adjustment values and menu settings etc., and also performs display of still images that have been stored in the built-in memory 33 or the external memory 34. The operation section 36 is for the user to designate various setting of the digital camera and perform an exposure operation by means of the release button, power switch lever, control dial etc.

Figure 2:
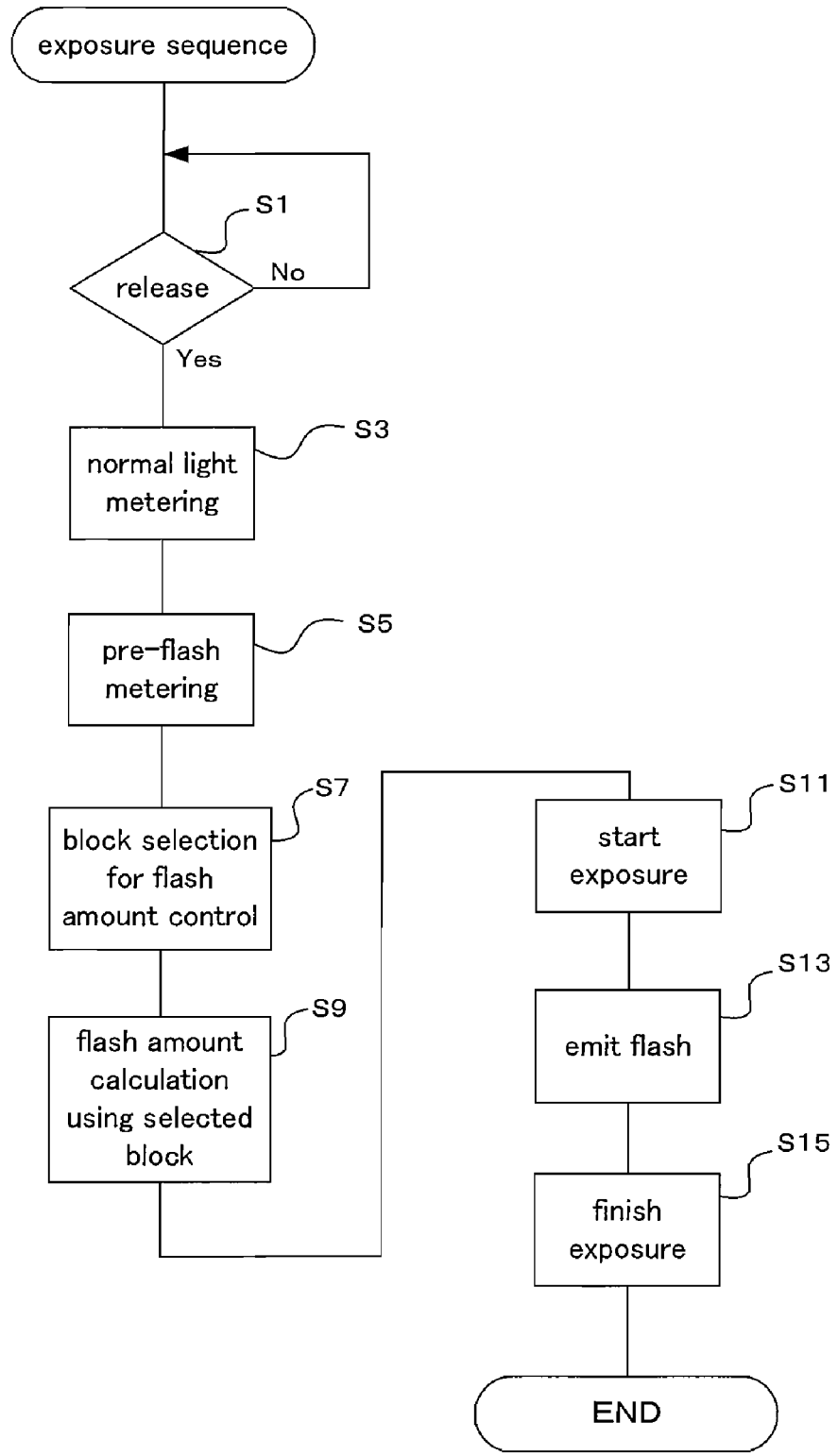
FIG. 2 is a flowchart of an exposure operation for a digital camera relating to one embodiment of the present invention.

Next, an exposure operation of the digital camera of an embodiment of the present invention will be described using the flowchart shown in FIG. 2. In the flowchart for the exposure operation sequence of FIG. 2, description mainly centers on metering operations, strobe emission control and exposure operation, and other known techniques, such as display etc., are omitted. Also, this flowchart is not limited to operation of the CPU 21, and description also includes hardware of peripheral circuits.

When the digital camera of this embodiment has been subjected to power on reset, and is in an operating state, it is first of all determined whether or not the release button has been operated from a half pressed state (first release) to a fully pressed state (second release) (S1). If the result of determination is that the release button has been pressed down fully, metering for normal light is carried out (S3). In this metering for normal light, a metering value is obtained using the image processing section 31, based on a digital value for every image read from the image sensor 15 and subjected to AD conversion. As a metering value, an average value of image data is used for every plurality of metering blocks (metering frame) into which an exposure area is divided in the horizontal direction and the vertical direction.

Next pre-flash metering is carried out (S5). In this pre-flash metering, the strobe control section 26 outputs an emit flash command to the strobe section 27, an image signal of the image sensor 15 at the time of flash emission is readout, and based on this read our image signal, similarly to the case for metering for normal light, values are obtained in the image processing section 31 for every plurality of metering blocks.

If pre-flash metering is completed, block selection for flash light amount control is carried out (S7). Specifically, at the time of flash light exposure carried out after emission of pre-flash, selection of a metering block (metering frame, metering region) used in order to obtain correct exposure is carried out. In this embodiment, a face is recognized as a feature from within a subject image using digital image data that has been read out from the image sensor 15 and subjected to AD conversion, and information on a range containing the face is output. Selection of a metering block (metering frame) for flash light amount control is carried out using normal light metering information for every metering block (metering frame), and pre-flash metering information for every metering block (metering frame). This will be described in detail later.

If block selection for flash light amount control is completed, light amount calculation is carried out using the selected block (S9). In step 7, since one or a plurality of metering blocks used in flash light amount control are selected, light amount of the strobe section 27 is obtained by calculation based on an average value of metering values for the selected block(s). In order to obtain the correct exposure amount, the average value of the metering values is not limited, and it is also possible to carry out calculation by appropriately weighting the metering value etc.

If strobe light amount value calculation is completed, the exposure operation starts (S11). As the exposure operation, in the case of a focal plane type digital camera, a stopping down operation of the aperture 13 is carried out, and at the same time a shutter opening operation is carried out, reset of the electronic shutter of the image sensor 15 is released, and charge accumulation commences. In a digital camera that is not provided with an aperture and mechanical shutter, it is only necessary to release the reset of the electronic shutter of the image sensor 15.

If the exposure operation is commenced, strobe light emission is next performed (S13). The strobe control section 26 obtains correct exposure by controlling the light emission time based on the light amount (guide number) obtained in step S9. If an exposure time corresponding to the shutter speed for obtaining the correct exposure has elapsed from exposure start, an exposure completion operation is carried out (S15). Specifically, the aperture is opened up, and the shutter is closed. Readout of a taken mage from the image sensor 15 is also commenced. The strobe light timing can be immediately after the start of exposure, immediately before exposure or even during exposure.

With this embodiment, in response to an operation to press the release button down fully, processing advances to steps S1-S3, and normal metering commences, but it is also possible to commence normal light metering in response to an operation to press the release button down halfway, and to commence the exposure operation of step S11 in response to an operation to an operation to press the release button down fully.

Figure 3:
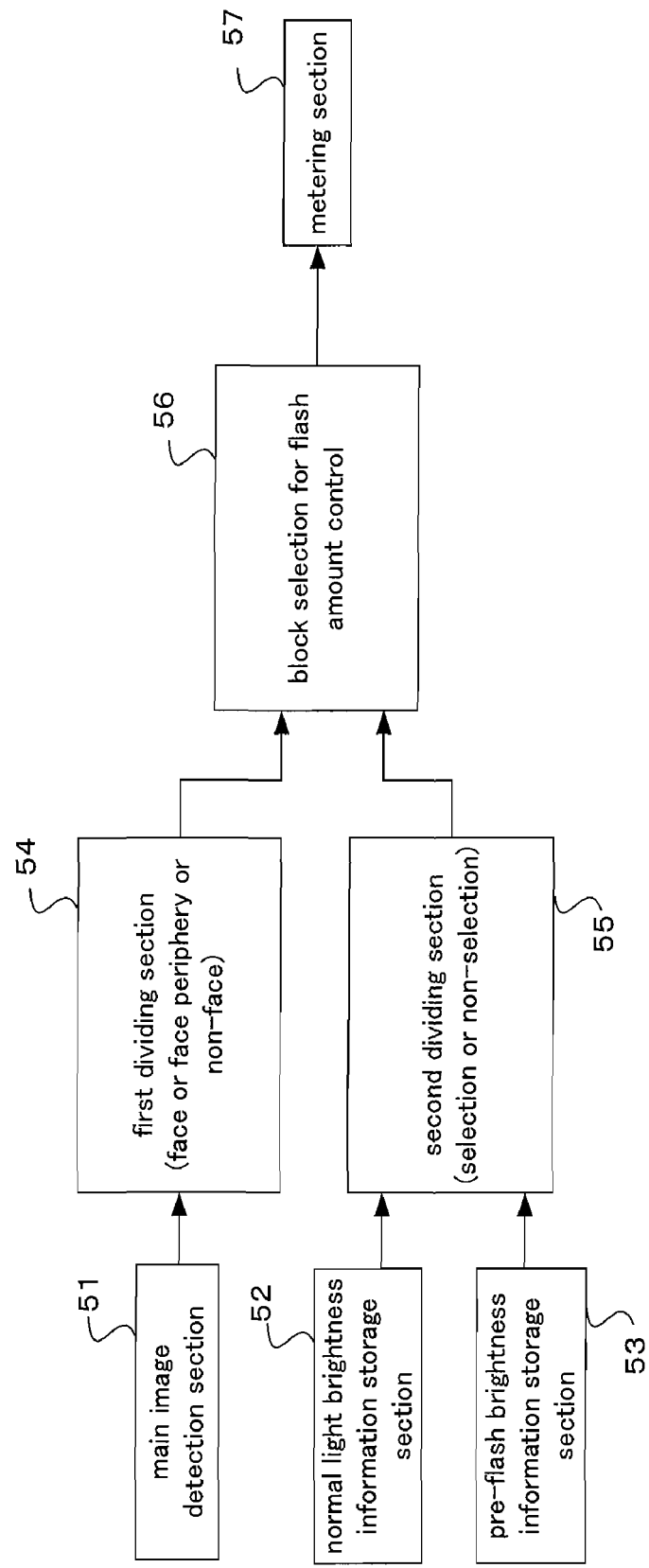
FIG. 3 is a block diagram of an image processing section 31 relating to one embodiment of the present invention.

Next, description of block selection for the flash light amount control of step S7 will be described using a block diagram showing internal functions of the image processing section shown in FIG. 3. The main image detection section 51 divides into a main image region (first image region) to which a face, which is a main image, belongs, and a minor region (second region) other than the main region, and outputs information for these regions. This information output is obtained based on range (position) information of a face extracted from within the exposure region by means of image recognition technology using digital image data that is based on an image signal read out from the image sensor 15. The first dividing section 54 divides into three regions of a face, facial periphery, and other than a face, within a plurality of metering blocks, based on output of the main image detection section 51. Operation of the main image detection section 51 and the first dividing section 54 will be described later using FIG. 4.

The normal brightness information storage section 52 is a memory for storing the metering results for normal metering performed in step S3. As metering results, average values of all image data within each metering block are stored for each metering block. The pre-flash brightness information storage section 53 is a memory for storing the metering results for pre-flash metering performed in step S5. The metering results, similarly to the case of normal light metering, are average values of image data stored for each metering block.

The second dividing section 55 divides a plurality of metering blocks into selection regions and non-selection regions, based on brightness differences obtained from normal metering values and pre-flash light metering values. Operation of the second dividing section 55 will be described later using FIG. 5 to FIG. 7.

Output of the first dividing section 54 and output of the second dividing section 55 are connected to the block section 56 for flash light amount control. This block selection section 56 performs selection of metering blocks used in flash light amount control, using region division of the first dividing section 54 and selection results of the second dividing section 55. Details of these operations will be described later using FIG. 8.

Output of the block selection section 56 is connected to the metering section 57. A brightness value for flash light amount control is obtained by the metering section 57 through calculation, using the selected metering block. It is also possible to implement each of the blocks of FIG. 3 using hardware, but in this embodiment the main image detection section 51, dividing section 54, dividing section 55, block selection section 56 and metering section 57 are implemented as software by the CPU 21.

Figure 4A:
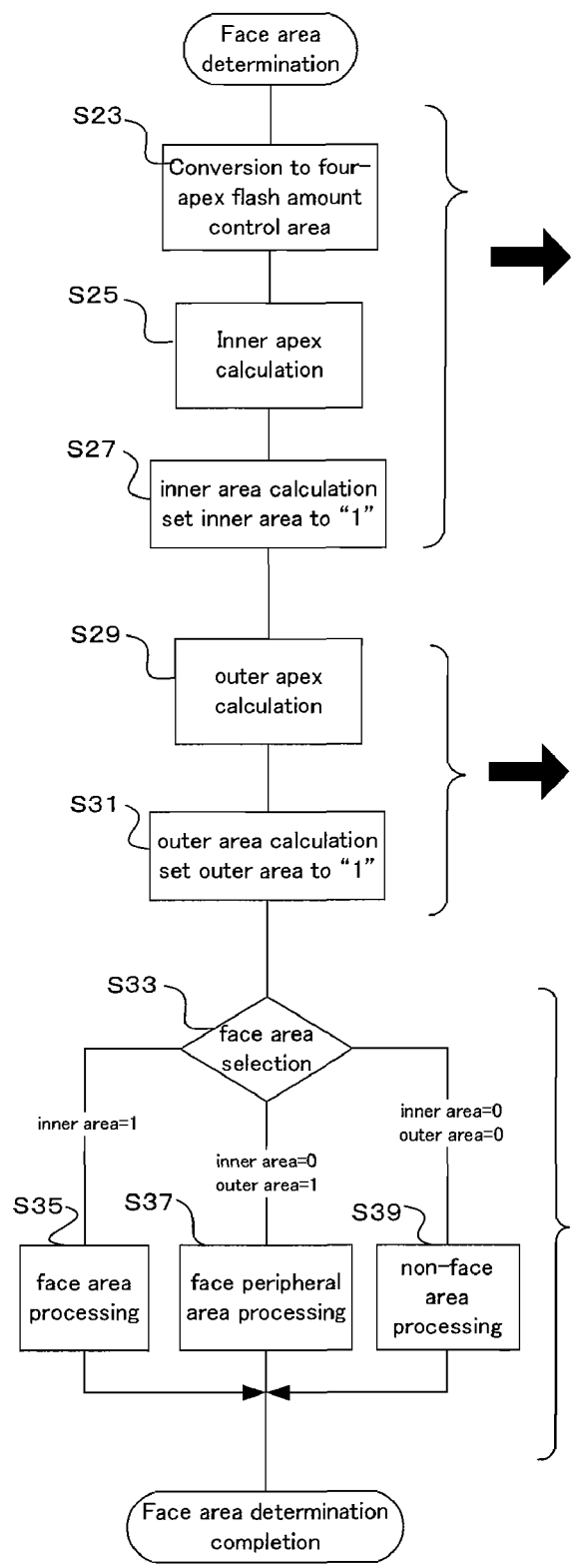
FIG. 4A to FIG. 4D are drawings showing a facial area determination operation of one embodiment of the present invention, with FIG. 4A being a flowchart, FIG. 4B being a drawing showing a state of a metering block at the time of calculating an inner area, FIG. 4C being a drawing showing a state of a metering block at the time of calculating an outer area, and FIG. 4D being a drawing showing a state where the metering block has been divided
Figure 4B:
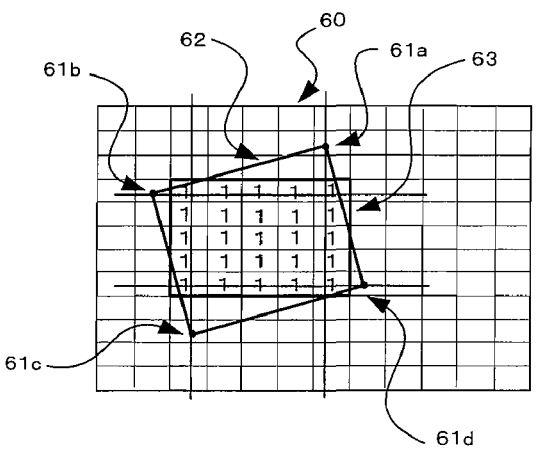
Figure 4C:
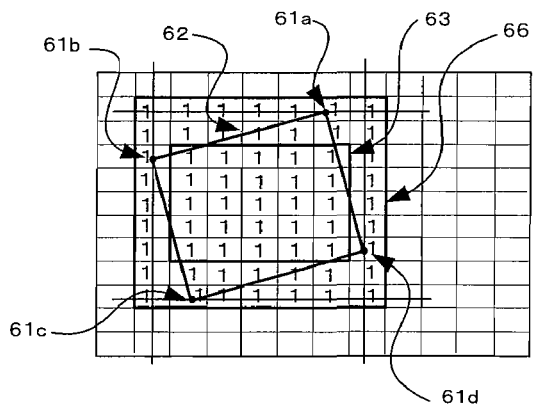
Figure 4D:
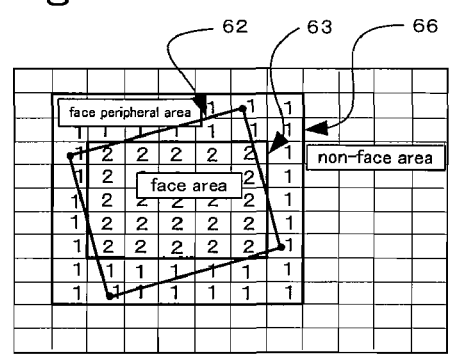

Next, operation of the main image detection section 51 and the first dividing section 54 will be described using the flowchart for facial area determination shown in FIG. 4A, but first the metering blocks will be described. An exposure region (flash light amount control area) 60, that is, a region where digital image data based on individual imaging elements of the image sensor 15 are output, is divided into twelve sections horizontally and divided into twelve sections vertically, as shown in FIG. 4B, FIG. 4C and FIG. 4D. Accordingly, the image region 60 is divided into 12×12=144 metering blocks. It is possible to set an inner area flag and an outer area flag, which will be described later, for each of the metering areas, and in an initial state both flags are set to "0".

In this embodiment divided into these types of metering blocks, conversion is carried out to a four-vertex flash light amount control area (S23). A four-vertex position of a facial area is converted to vertex positions 61a, 61b, 61c and 61d on the image region 60 by image recognition software for recognition of a face, which is a feature section of the subject. A square inner side enclosed by these four apex positions 61a, 61b, 61c and 61d is a main image region (first region) 62 where the face exists. Also, a square outer side surrounded by the apex positions 61a, 61b, 61c and 61d is a non-main image region (second region) 62 where the face does not exist.

If conversion to the four-apex imaging region (flash light amount control area) is complete, calculation of inner apexes is then performed (S25). The inner apexes are two points, within the four apex positions 61a, 61b, 61c and 61d, that are at an inner side in the horizontal direction, and two points that are at an inner side in the vertical direction. In other words, with an intersection of diagonal lines passing through the four apex positions 61a, 61b, 61c and 61d of the square as a Cartesian coordinate center, the inner apexes are two points, within the four apexes, whose horizontal direction coordinates are close to the coordinate center, and two points, within the four apexes, whose vertical direction coordinates are close to the coordinate center. In the example shown in FIG. 4B, the two inner points in the horizontal direction are the apex position 61a and the apex position 61c, and the vertical direction inner two points are the apex position 61b and the apex position 61d.

If calculation of the inner apexes is completed, calculation of the inner area is then performed (S27). The inner area 63 is a region formed by metering blocks included inside vertical lines respectively passing through the previously described apex position 61a and the apex position 61c, and horizontal lines respectively passing through the apex position 61b and the apex position 61d. Once the inner area 63 has been obtained, the flags of metering blocks inside this inner area are set to "1".

Next calculation of outer apexes is carried out (S29). The outer apexes are two points, of the four apex positions 61a, 61b, 61c and 61d, that are at an outer side in the horizontal direction, and two points that are at an outer side in the vertical direction. In other words, with a center of the four apexes as a Cartesian coordinate center, the outer apexes are two points, within the four apexes, whose horizontal direction coordinates are furthest from the coordinate center, and two points, within the four apexes, whose vertical direction coordinates are furthest from the coordinate center. In the example shown in FIG. 4B and FIG. 4C, the two outer points in the horizontal direction are the apex position 61*b* and the apex position 61*d*, and the vertical direction outer two points are the apex position 61*a* and the apex position 61*c*.

If calculation of the outer apexes is completed, calculation of the outer area is then performed (S31). The outer area 66 is a region formed by metering blocks included inside horizontal lines respectively passing through the apex position 61*a* and the apex position 61*c*, and vertical lines respectively passing through the apex position 61*b* and the apex position 61*d*. Once the outer area 66 has been obtained, the flags of metering blocks inside this outer area are set to "1".

Next selection of a face area is carried out (S33). Specifically, for every metering block, processing is performed to classify into three areas, namely a face area, a face peripheral area, and a non-face area, from the state of the inner area and the outer area. First, in the case where an inner area flag is "1", that is, when inner area=1, it is determined to be a face area (third region), and face area processing is carried out in the metering blocks (S35). In FIG. 4D, the metering blocks have been assigned the number "2" in order to show that it is a face area.

In the case where the result of determining the flags of the inner area and the outer area is that the inner area=0 and the outer area=1, it is determined to be a face peripheral area, and face peripheral processing is carried out in those metering blocks (S37) In FIG. 4D, the metering blocks have been assigned the number "1" in order to show that it is a face peripheral area. Also, in the case where the inner area=0 and the outer area=0, it is determined to be a non face area (fourth region), and non face processing is carried out in those metering blocks (S39).

As described above, in the face area determination of this embodiment, for a main image region 62 determined as being unrelated with the metering blocks determined according to the arrangement direction of the pixels of the image sensor 15, it is possible to divide into a face region (third region) in which the main image is included and a non-face area (fourth region) in which the main image is not included, using the apex positions of the main image region 62. It is therefore possible to carry out highly reliable evaluation metering, and it is possible to carry out calculations in units of metering blocks, which means that high speed processing becomes possible.

Also, in this embodiment, division is carried out to divide into two regions, namely a region where a main image detected using image recognition techniques exists (main image region, first region) and a region where the main image does not exist (non-main image region, second region). Then, with respect to the metering blocks, processing is carried out to divide into three regions, namely a region where a main image region is included (inner area, face area, third region), a region that is non-main image region and is also not an outer area (non-face area, fourth region), and a region close to a boundary between the main image region and the non-main image region (face peripheral area). It therefore becomes possible to obtain correct exposure by processing metering values of the face peripheral area at the time of backlighting etc.

In this embodiment, a region in which the main image exists has been represented by a square using four apexes 61*a*, 61*b*, 61*c* and 61*d*, but this is not limiting, and it is also possible to have a polygonal shape such as triangle or a pentagon. Also, in the case where the region in which the main image exists is expressed with a circle or an ellipse etc., it is possible to carry out the same processing as with this embodiment as long as it approximates to a polygon. Further, in this embodiment, as the main image a face has been extracted from image data, but this is not limiting and it is also possible, for example, to use the eyes, nose or mouth, and to use a person's entire body as the main image.

Figure 5:
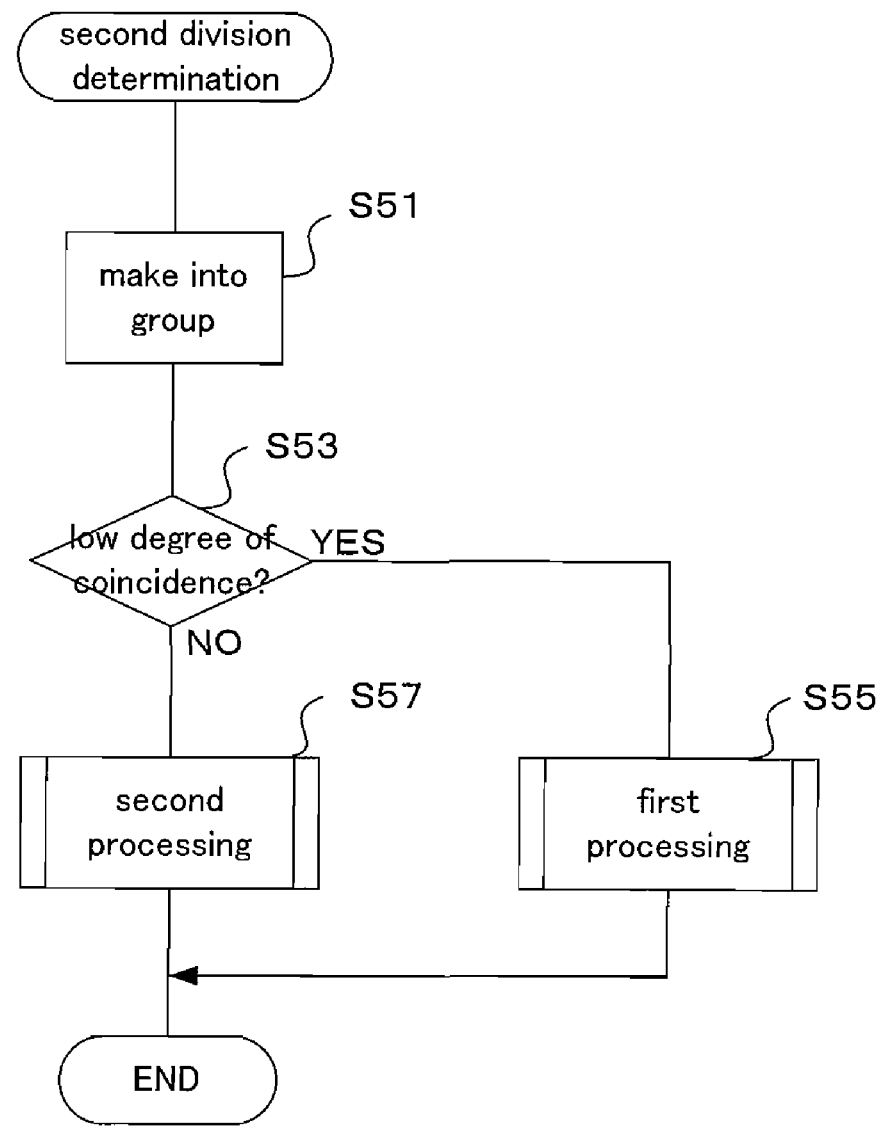
FIG. 5 is a flowchart of second division determination for a digital camera relating to one embodiment of the present invention.

Next, the second dividing section 55 will be described using FIG. 5 to FIG. 7. The second dividing section performs selection of a flash light amount controlled image region for the strobe section 27 according to a degree of coincidence in differences of metering results for each metering block, from a metering value for normal light metering in step S3, and a metering value for pre-flash metering in step S5. In this embodiment, selection of metering blocks is carried out using substantially the same method as disclosed in Japanese unexamined patent application No. 2002-062580. The entire disclosure of unexamined Japanese patent application No. 2002-062580 is hereby incorporated by reference thereto.

Figure 6A:
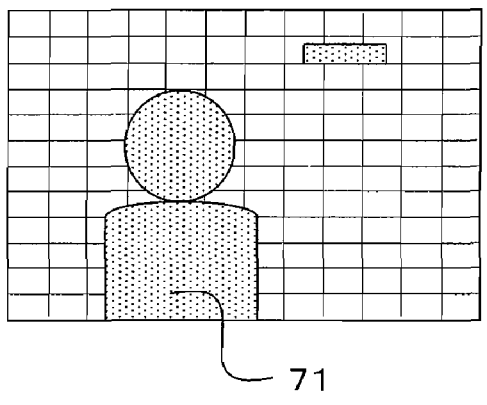
FIG. 6 is a drawing for explaining second division determination, in a digital camera relating to one embodiment of the present invention, in the case of carrying out regular metering and pre-flash metering.
Figure 6B:
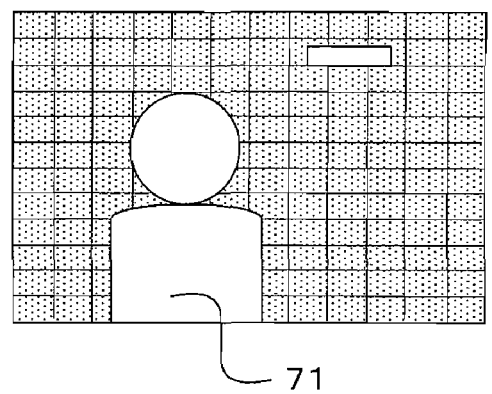
Figure 6C:
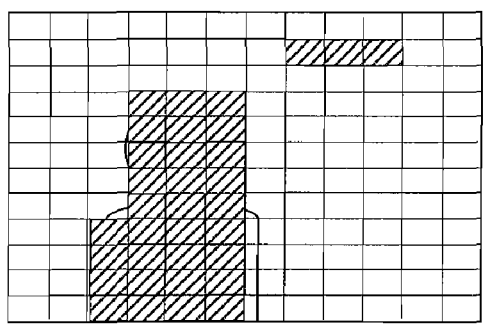
Figure 6D:
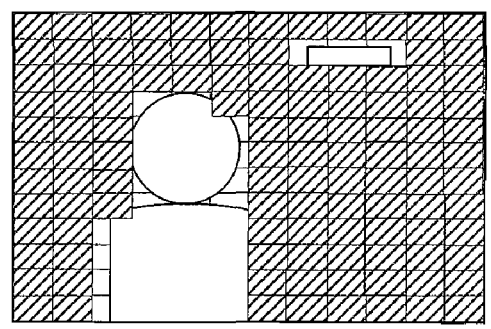
Figure 6E:
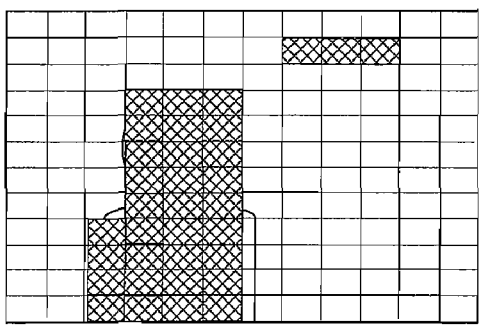

First, each metering block is made into a group (S51). This is done by comparing an average value for each metering block with a threshold value, and determining "0" or "1" depending on whether the value is larger or smaller than the threshold value. For example, in a case where the background is far away, a person constituting the exposure subject 71 is positioned to the front and the subject is back lit, then with normal light, as shown in FIG. 6A the exposure subject 71 is dark, and the background is bright. If pre-flash metering is carried out in this state, the exposure subject 71 in front becomes bright as a result of sufficient reflection of the flash light, while sufficient light does not reach the distant objects and so they are comparatively dark. If the grouping of step S51 is carried out in these two states, the results will be as shown in FIG. 6C and FIG. 6D. A flag for metering blocks of low brightness/low reflected light amount is assigned "0", but in the drawing these metering blocks are shown by diagonal lines.

Figure 7A:
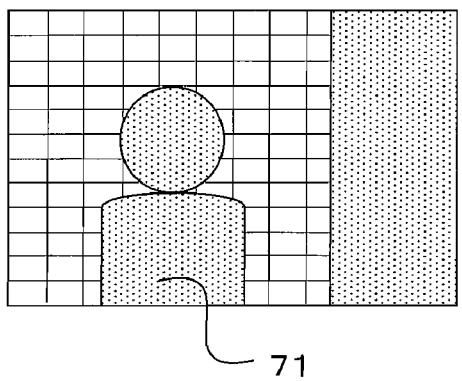
FIG. 7 is a drawing for explaining another example of second division determination, in a digital camera relating to one embodiment of the present invention, in the case of carrying out regular metering and pre-flash metering.
Figure 7B:
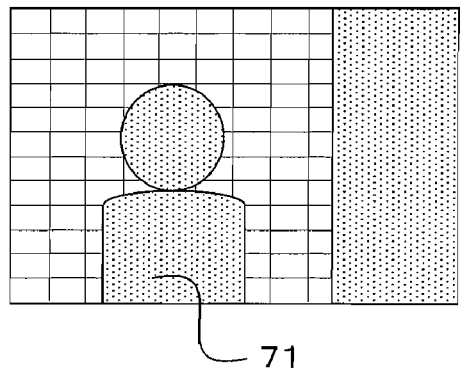
Figure 7C:
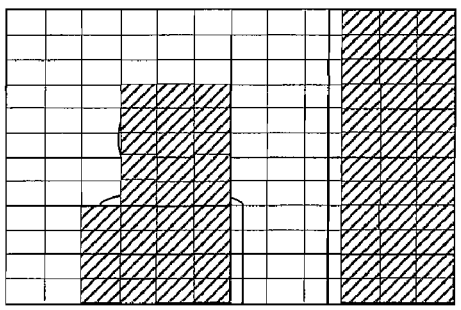
Figure 7D:
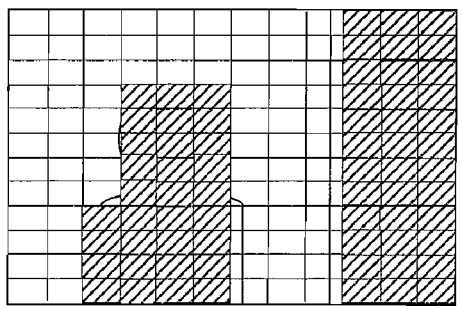
Figure 7E:
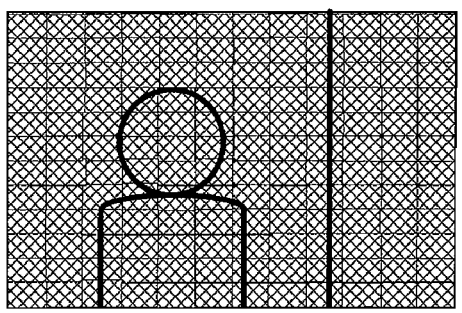

Also, as a separate example, a case is assumed where a person who is the exposure subject is placed in front of a highly reflective object, for example, and the side of the subject becomes distant. In this case, if normal light metering is performed, as shown in FIG. 7A, the person who is the exposure subject and the distant object become dark, giving the effect that the highly reflective object behind the subject is bright. If pre-flash metering is performed, as shown in FIG. 7B, the amount of reflected light from the highly reflective object behind the subject is strong, and so the person who is the exposure subject and the distant object become bright, giving the effect that the highly reflective object behind the subject is bright. If the grouping of step S51 is carried out in these two states, the results will be as shown in FIG. 7C and FIG. 7D. A flag for metering blocks of low brightness/low reflected light amount is assigned "0", but in the drawing these metering blocks are shown by diagonal lines.

If grouping is completed, determination of degree of coincidence between groups processed in the metering blocks is carried out (S53). With the example of FIG. 6, if FIG. 6C and FIG. 6D are compared they are both substantially the exact opposite of each other, and so degree of coincidence is low. On the other hand, with the example of FIG. 7, if FIG. 7C and FIG. 7D are compared they are both substantially the same, and so degree of coincidence is high.

In the event that degree of coincidence is low, as in FIG. 6, processing advances to step S55, where first processing is carried out. In the first processing, metering blocks where the metering results for normal light metering are dark, and the metering results for pre-flash metering are bright, such as the hatched metering blocks of FIG. 6E, are selected. This is because in sections where the normal metering is dark and the pre-flash metering is bright it is better to perform exposure control so as to get correct exposure since the background is far away, and strobe light is only really returned from the exposure subject person 71.

Also, in the event that degree of coincidence is high, as in FIG. 7, processing advances to step S57, where second processing is carried out. In the second processing, all metering blocks are made selection objects, as shown by the hatched metering blocks of FIG. 7E. This is because it is better to make all metering blocks the subject of evaluation because there is no change in the light amount with normal light and at the time of pre-flash.

In this way, the second dividing section 55 of this embodiment performs selection of metering blocks used at the time of flash light amount control using normal light metering values and pre-flash metering values. It is therefore possible to give a good light amount balance within the exposure region.

As the second dividing section 55, besides changing processing according to degree of coincidence of metering values at the time of normal light and pre-flash, as in this embodiment, it is also possible to appropriately select metering blocks according to magnitude of a brightness value with normal light metering, or magnitude of reflected light amount at the time of pre-flash, etc.

Next, operation of the block selection section 56 for flash light amount control will be described using the flowchart shown in FIG. 8. This block selection section 56 performs selection of metering blocks used in order to carry out final flash light amount control, from metering blocks that have been selected by the first dividing section 54 described using FIG. 4, and metering blocks that have been selected by the second dividing section 55 described using FIG. 5 to FIG. 7.

First, division area determination is carried out using the metering blocks selected by the second dividing sections 55 (S61). If the result of determination is that all metering blocks are selected, as in the example of FIG. 7A-FIG. 7E, processing advances to step S85, where it is determined whether or not a number of metering blocks of the face area is more than half of the total number of metering blocks. The metering blocks of the face area are blocks that have been subjected to face area processing in step S35 (FIG. 4). In step S85, comparison is made with the number of metering blocks, but it is also possible to perform determination based on comparison of the surface area of the face area and the flash light amount control area. Also, determination is performed as to whether a number is more than half a total number, but this is not limiting and it is also possible to perform determination with a different determination level such as ⅓, ⅖, ⅔ etc. of the total number.

If the result of determination in step S85 is that the number of blocks of the face area is less than half the total number of blocks, Process G to select all metering blocks as the metering block is carried out (S87). In the second dividing section 55, determination that all blocks have been selected is carried out, and from the fact that the number of blocks of the face area is not half of the total number of metering blocks, which means that there is a state where the face area is a small proportion of the overall image. Therefore, all metering blocks are elected in step S87 so as to give a good light amount balance for strobe light over the entire exposure area.

If the result of determination in step S85 is that the number of blocks of the face area is half the total number of blocks or more, Process H to select metering blocks within the face area (inner area 63) as the metering blocks is carried out (S89). In the second dividing section 55, determination that all blocks have selected was carried out, but the number of blocks of the face area is half of the total number of metering blocks or more, and there is a state where the face area is large proportion of the overall image. Emphasizing the importance of obtaining correct exposure for a face, that is an exposure subject, in step S89 metering blocks of the face area are selected.

If the result of determination in step S61 is that some of the metering blocks have been selected, as in the example shown in FIG. 6, or that there is no selection area, processing advances to step S63 where processing branches according to the determination result of the first dividing section 54 for each metering block. First, if it has been determined that a metering block constituting a determination subject belongs to a face area (inner area 63), the determination results of the second dividing section 55 to which that metering block belongs are referenced (S65).

If the result of determination in step S65 is a selection area, process A is carried out, and deselection of the blocks that are highly reflective at the time of pre-flash is carried out (S67). Specifically, in a selection region of the second dividing section 55, metering blocks that constitute subjects of this process A are metering blocks for which flash light amount control should be considered, such as the hatched sections in FIG. 6E, and with the first dividing section 54 are blocks determined to belong to a face area. Therefore, in flash light amount control only metering blocks in which there is a highly reflective object that gives a detrimental effect are deselected, and other metering blocks are used for flash light amount control. Determination as to whether or not there is a highly reflective object is carried out by determining whether or not a reflected light amount at the time of pre-flash metering is higher than a threshold value, and since the process A metering blocks are themselves blocks that will be made objects of flash light amount control, the threshold is made a sufficiently high level.

If the result of determination in step S65 is a non-selection area, process B is carried out (S69). In process B, in the event that there is high brightness at the time of normal light metering, and there are also highly reflective blocks at the time of pre-flash metering, those metering blocks are deselected. Metering blocks falling into this category are caused to be deselected by the second dividing section 55, which means that there is a possibility that there will be a highly reflective subject. Therefore, in process B, determination is carried out as to whether or not there is high brightness at the time of normal light metering and high reflectivity at the time of pre-flash metering. In this manner, metering blocks corresponding to high brightness high reflection spectacles, or strongly reflecting hair, are deselected.

If the result of determination in step S63 is that a metering block constituting a determination subject belongs in a face peripheral area (further out than the inner area 63 and further in than the outer area 66), determination is carried out as to whether or not the result of determination of the second dividing section 55 is a selection area (S71). If the result of determination is a selection area, then if there is high reflection at the time of pre-flash metering process C is carried out to deselect as a metering block (S73). A face peripheral area is a region where it is easy to be subjected to the effects of precious metals being worn by the subject. Therefore, in the case where there is high reflectivity at the time of pre-flash metering it is unsuitable as a metering block and so is deselected.

If the result of determination for the second dividing section 55 in step S71 is a non-selection area, process D is carried out to deselect metering blocks where there is high brightness at the time of normal light metering, and where there is high reflectivity at the time of pre-flash metering (S75). If the result of determination of the second dividing section 55 in the face peripheral area is a non-selection area, Process D is executed because there is a possibility of being affected by rays of light from the background at the face periphery, namely backlight. The determination level for the process C and the process D is made lower than the determination level for Process A and process B. This is because since it is a face peripheral area, the level of importance is lower than for a face area with respect to flash light amount control.

If the result of determination in step S63 is that a metering block of a determination subject is a non-selection area (outside the outer area 66, non-face area), determination is carried out as to whether or not it is an area selected by the second dividing section 55, similarly to step S65 and S71 (S77). If the result of determination is a selection area, then process E is carried out to deselect metering blocks having high reflection at the time of pre-flash metering (S79). When carrying out this process E, there is a non-face area, but since there is a selection area with the second dividing section 55, metering blocks in which there is a lot of reflected light such a precious metals or hair are deselected from the viewpoint of balancing light amount within the exposure area If the determination result for the second dividing section 55 in step S77 is that there is a non-selection area, processing F for when there is no selected metering block is carried out (S81). This is because since there is a non-selection area, and also because there is also a non-selection area in the second dividing section 55, there is no need to consider as a metering block at the time of flash light amount control.

When processing has advanced to step S63, the processing of steps S63 to S81 is repeatedly executed for each metering block, and if processing is completed for all of the metering blocks this processing flow completes and processing returns to the original routine. After that, as described previously, evaluation calculations using metering values of selected metering blocks is carried out, and exposure controls such as shutter speed, aperture and flash are carried out.

In this way, in block selection for flash light amount control of this embodiment, metering blocks used in the flash light amount control are selected using processing results of the first dividing section for dividing an area from a positional relationship with the main image, and the second dividing section 55 for selecting blocks from metering results of normal light metering and pre-flash metering. As a result, together with correct exposure for the main image, it is possible to get a correct light amount balance for the strobe.

Also, in block selection for flash light amount control of this embodiment, on the process A and process B etc., metering blocks where there is high brightness and high reflectivity are deselected, which means that there is no influence of high brightness and high reflectivity, such as glass, hair, spectacles, or precious metals etc., and it is possible to obtain correct exposure for the subject. In this embodiment, only metering blocks that have high brightness or high reflectivity are deselected, but this is not limiting and it is also possible to additionally deselect metering blocks of low brightness or low reflection.

Further, in the block selection for flash light amount control of this embodiment, in step S85 processing is varied in accordance with the number of metering blocks of the main image such as a face, which means that it is possible to carry out appropriate exposure control and flash light amount control according to the size (surface area) of the main image.

As has been described above, in a digital camera of an embodiment of the present invention, the digital camera controls actual flash amount at the time of exposure based on an amount of reflected light from a predetermined metering region of a screen, and comprises a first screen dividing section (second dividing section 55) for dividing the screen into a first region (selection area) constituting a candidate for a metering region, and a second region (non-selection area) other than that by comparing first feature data (pre-flash metering values) of image data that has been acquired by performing pre-flash before actual flash and second feature data (normal light metering values) of image data taken without performing pre-flash (S53 in FIG. 5), a second screen dividing section (first dividing section 54) for dividing the screen into a third region (face area, inner area 63), being a region of an image having a predetermined feature, and a fourth region (non-face area) other than that, an image evaluation section (block selection section 56, processing of FIG. 8) for evaluating whether to include in the metering region or remove from the metering region based on different evaluation criteria according to whether the image of the third region or the fourth region belongs to the first region, or belongs to the second region (S61 in FIG. 8), and a flash amount control section (strobe control section 26) for controlling actual flash amount based on reflected light amount from regions that have been included in the metering region by the image evaluation section.

In this way, in this embodiment, it is possible to control actual light amount so that brightness of an image that is to be emphasized within the screen (image having a predetermined feature) and brightness of an image at a peripheral region are well balanced.

Also, with the digital camera of this embodiment of the present invention, the first screen dividing section and the second screen dividing section perform region division of the screen in units of blocks divided into a plurality of small regions (in this embodiment 12×12). Since it is possible to process in block units like this, it is possible to perform calculations at high speed.

Also, with the digital camera of this embodiment of the present invention, the second screen dividing section (first dividing section 54) divides into a face image region (face region, third region) and a region other than this. It is therefore possible to make the brightness of a face correct.

Further, the digital camera of this embodiment of the present invention is provided with a comparison section for, when a result of region division by the first screen dividing section (second dividing section 55) is that there is no image that belongs in the second region (that is, when all are determined to be a election area), comparing the surface area the third regions that has been divided by the second screen dividing section (first dividing section 54) with the surface area of the entire screen, and if the result of comparison by the comparison section (S85 in FIG. 8) is determination that the surface are of the third region (face area) is a specified value or greater the image evaluation section includes the whole of the third region in the metering regions, and when the result of comparison by the comparison section is determination that the surface are of the third region is less than the specified value the image evaluation section (block selection section 56, processing of FIG. 8) includes the region of the whole screen in the metering region.

In this way, when an image that is emphasized most within the screen (image having a predetermined feature) has a surface area greater than a specified value within the entire screen, the brightness of the entire image is put into balance even if only the brightness of the emphasized image is corrected, and correct brightness is also obtained for the emphasized image itself. On the other hand, when the surface area of the emphasized image is small on the screen overall, the periphery will be underexposed or overexposed even if only the emphasized image is made the correct brightness, and so overall brightness will not be well balanced, which means that by including the region of the entire screen in the metering region it is possible to take an image having the brightness of the entire screen well balanced.

Figure 8:
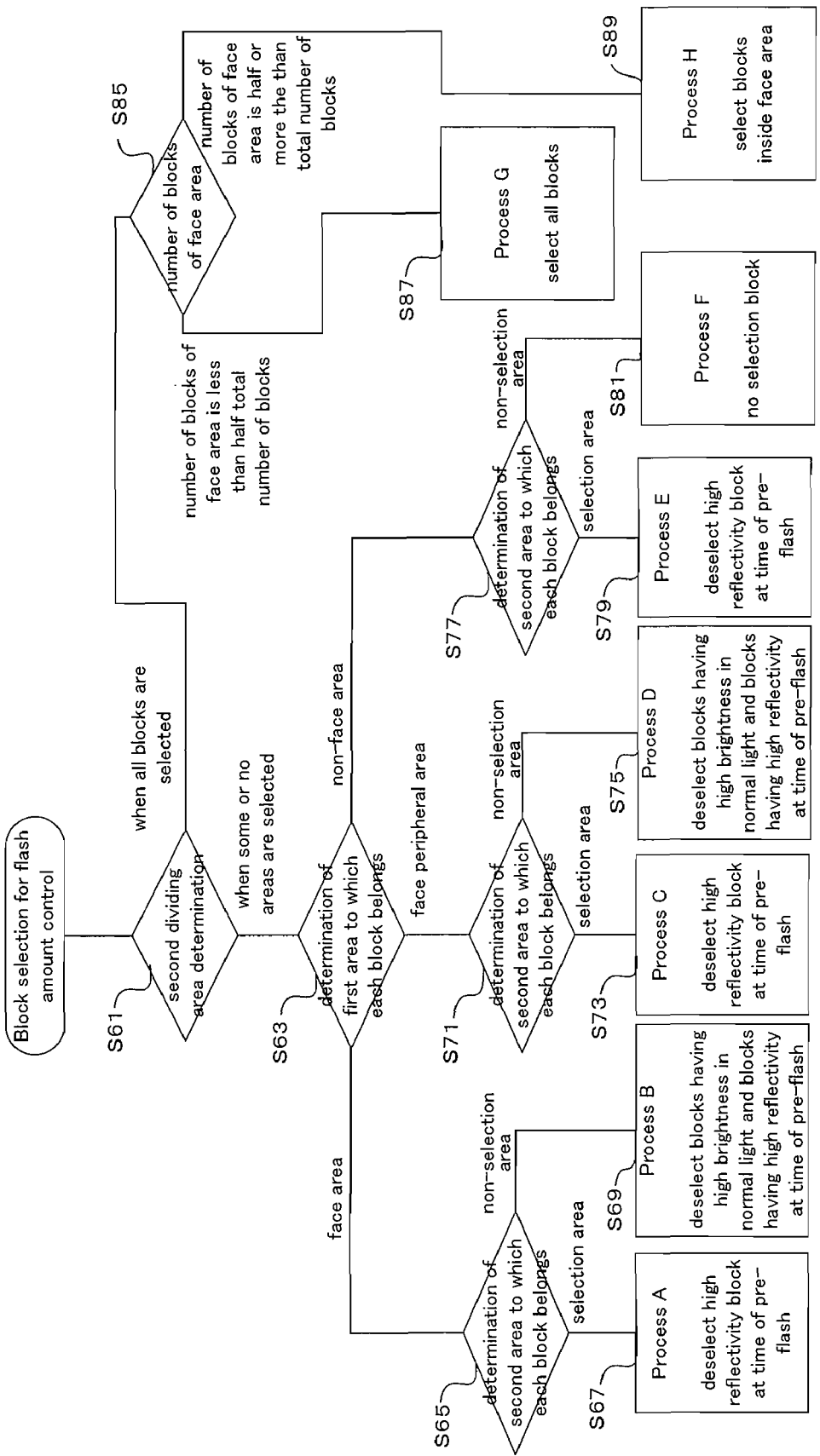
FIG. 8 is a flowchart of block selection for flash light amount control in a digital camera relating to one embodiment of the present invention.

Further, the digital camera of this embodiment of the present invention is capable of controlling light amount of a built in flash unit (strobe section 27) or externally mounted flash unit, and is provided with pre-flash metering means (S5 in FIG. 2) for performing metering for amount of reflected light from a subject at the time of pre-flash emission carried out before actual flash emission of the built in or externally mounted flash unit in metering block units, normal light metering means (S3 in FIG. 2) for performing metering of subject brightness under normal light in metering block units, a first area selection means (second dividing section 55) for selecting metering blocks based on metering results by the normal light metering means and the pre-flash metering means, second area selection means (main image detection section 51) for carrying out image recognition of a subject and selecting metering blocks that are connected to a main image, and metering calculation means (S9 on FIG. 2, metering section 27) for obtaining flash amount at the time of actual flash emission by the built in flash unit or externally mounted flash unit based on metering blocks selected by the first area selection means and the second area selection means (block selection section 56, processing of FIG. 8).

In this way, it is possible to get correct exposure of a feature section of a subject image since actual flash amount at the time of flash emission is obtained based on metering blocks selected by the first area selection means and the second area selection means, and it is also possible to get good light amount balance for the entire screen.

In the description of this embodiment of the present invention, an example has been adopted of a digital camera as the image taking apparatus, but as a digital camera it is possible to have a single lens reflex type camera or a compact type digital camera, and it is also possible to adopt the present invention in an imaging apparatus incorporated into a dedicated device other than these digital cameras.

What is claimed is:

1. An image pickup apparatus, for controlling an actual flash amount at the time of exposure based on an amount of reflected light from specified metering regions of a screen, comprising:

a first screen dividing section for dividing the screen into a first region constituting a candidate for the metering region, and a second region different from the first region, by comparing first feature data of image data acquired by carrying out a pre-flash before an actual flash, and second feature data of image data obtained without carrying out the pre-flash;

a second screen dividing section for dividing the screen into a third region, being a region of an image having a predetermined feature, and a fourth region different from the third region;

an image evaluation section for evaluating if an image of the third region or the fourth region is included in the metering region or removed from the metering region based on different evaluation criteria according to whether the image belongs to the first region or belongs to the second region; and a flash amount control section for controlling the actual flash amount based on an amount of reflected light from the region included in the metering region by the image evaluation section.

2. The image pickup apparatus of claim 1, wherein the first screen dividing section and the second screen dividing section perform region division of the screen in units of blocks that have been divided into a plurality of small regions.

3. The image pickup apparatus of claim 1, wherein the second screen dividing section divides the screen into a region of a face image and a region different from the face image.

4. The image pickup apparatus of claim 1, further comprising:

a comparison section for, when the result of region division by the first screen dividing section is that there is no image belonging to the second region, comparing a surface area of the third region that has been divided by the second screen dividing region, and surface area of the entire screen, and when the result of comparison by the comparison section is a determination that the surface area of the third region is a specified value or larger, the image evaluation section includes the whole of the third region in the metering region, and when the result of comparison by the comparison section is a determination that the surface area of the third region is less than a specified value, the image evaluation section includes the region of the entire screen in the metering region.

5. An image pickup apparatus, capable of controlling a flash amount of a built-in flash unit or an externally mounted flash unit, comprising:

a pre-flash metering section for performing metering for a reflected light amount from a subject at the time of a pre-flash that is performed before an actual flash of the built-in flash unit or the externally mounted flash unit, in metering block units;

a normal light metering section for performing metering for brightness of a subject under normal light, in the metering block units, a first area selection section for selecting metering blocks based on metering results by the normal light metering section and the pre-flash metering section;

a second area selection section for carrying out image recognition for a subject and selecting metering blocks that are connected to a main image; and a metering calculation section for obtaining the flash amount at the time of the actual flash using the built-in flash unit or the externally mounted flash unit, based on metering blocks that have been selected by the first area selection section and the second area selection section, wherein, when all metering blocks have been selected by the first area selection section, the metering sections are switched according to a number of metering blocks connected to the main image that have been selected by the second area selection section.

6. An image pickup method, for controlling an actual flash amount at the time of exposure based on an amount of reflected light from specified metering regions of a screen, wherein:

the screen is divided into a first region constituting a candidate for the metering region, and a second region different from the first region, by comparing first feature data of image data acquired by carrying out a pre-flash before an actual flash, and second feature data of image data obtained without carrying out the pre-flash;

the screen is divided into a third region, being a region of an image having a predetermined feature, and a fourth region different from the third region;

whether an image of the third region or the fourth region is included in the metering region or removed from the metering region is evaluated based on different evaluation criteria according to whether the image belongs to the first region or belongs to the second region; and the actual flash amount is controlled based on an amount of reflected light from the region included in the metering region by the image evaluation section.

* * * * *